US007124499B2

(12) United States Patent
Villeneuve et al.

(10) Patent No.: US 7,124,499 B2
(45) Date of Patent: Oct. 24, 2006

(54) APPARATUS FOR INSTALLING A LENGTH OF WIRE

(75) Inventors: Jean-Claude Villeneuve, Boisbriand (CA); Michel Décarie, Verdun (CA); Normand Lassonde, Pincourt (CA); Pierre Kakos, Laval (CA); Paul-André Messier, Montréal (CA)

(73) Assignee: Simpler Networks Inc., Saint-Laurent (CA)

( * ) Notice: Subject to any disclaimer, the term of this patent is extended or adjusted under 35 U.S.C. 154(b) by 388 days.

(21) Appl. No.: 10/631,041

(22) Filed: Jul. 29, 2003

(65) Prior Publication Data

US 2005/0022360 A1 Feb. 3, 2005

(51) Int. Cl.
*B23P 19/00* (2006.01)
*H01R 43/04* (2006.01)

(52) U.S. Cl. ............................ 29/753; 29/759; 29/760; 29/861; 29/863

(58) Field of Classification Search ............... 29/33 M, 29/34 F, 34 D, 861–863, 844, 845, 833, 834, 29/739, 759, 760, 720, 721, 753; 140/93 R
See application file for complete search history.

(56) References Cited

U.S. PATENT DOCUMENTS 1,392,451 A * 10/1921 Rowe .......................... 105/177
1,851,028 A * 3/1932 Worrall ....................... 248/363
2,627,675 A * 2/1953 Kitteredge ................... 434/45
3,796,392 A * 3/1974 Starace ....................... 242/156
4,043,032 A 8/1977 Spangler
4,087,908 A 5/1978 Fusco et al.
4,616,396 A * 10/1986 Matsui ....................... 29/566.1
5,018,270 A * 5/1991 Caumanns ................... 29/863
5,357,669 A * 10/1994 Orphanos et al. .......... 29/566.3
5,575,061 A * 11/1996 Tsuji et al. .................... 29/863
5,611,141 A 3/1997 Takada et al.
6,073,471 A * 6/2000 Naka et al. .................. 72/21.3
6,301,777 B1 * 10/2001 Sigler et al. .................. 29/753
6,655,013 B1 * 12/2003 Wilson et al. ................ 29/751
6,738,134 B1 * 5/2004 Maeda .................... 356/237.2

FOREIGN PATENT DOCUMENTS

CA 2045837 A 12/1991
CA 2062017 A 5/1993

OTHER PUBLICATIONS

NERLITE Diffuse On Axis Light (DOAL) and Collimated On Axis Light (COAL), Feb. 20, 2001,http://web.archive.org/web/20010220174543/http://www.nerlite.com/products/doal.html.*

* cited by examiner

*Primary Examiner*—A. Dexter Tugbang
*Assistant Examiner*—Livius Radu Cazan
(74) *Attorney, Agent, or Firm*—Timothy J. Keefer; Seyfarth Shaw LLP

(57) ABSTRACT

The apparatus is used for installing a wire in a crimp, in particular a wire being provided on a wire spool mounted on a spool holder. The wire outputs the apparatus at a wire output guide. The apparatus comprises a crimp punch tool located in front of the wire output guide. A first actuator allows operating the crimp punch tool. The wire is cut using a wire cutter adjacent to the crimp punch tool. The cutter tool is operated by a second actuator. In use, the wire is installed by feeding the wire from the wire spool through the wire output guide and then into the crimp. The crimp is closed by punching it using the crimp punch tool. The wire is cut after the last crimp using the wire cutter tool. The apparatus and method can be used for installing very fragile and small wires.

4 Claims, 16 Drawing Sheets

APPARATUS FOR INSTALLING A LENGTH OF WIRE

TECHNICAL FIELD

The present invention relates to an apparatus for installing a length of wire, in particular a length of wire between two mechanical attachment points.

BACKGROUND

In the past, very small wires were always very difficult to install properly using an automated process. The main challenge is to adequately position the wire, attach it properly and then cut it at the right location. A further challenge is to keep the tension in the wire within an appropriate range, especially in the case of wires achieving a mechanical function. Examples of such wires are the ones used as micro actuator mechanisms. These micro actuator mechanisms are useful in many applications, such as in very small mechanical relays, sensors, flow controllers, valves, etc. Micro actuator mechanisms used in these applications typically use heat-shrinkable wires to achieve movement of internal mechanical structures performing various functions. An example of heat-shrinkable material is a Nickel-Titanium alloy. In the case of a relay application, the heat shrinkable wire is used to open and close contacts of the relay. This wire replaces conventional actuators, such as electromagnetic actuators, electro-static actuators, bimetallic actuators, etc. The advantage of this new mate rial is that it enables significant size and cost reduction if an automated manufacturing process is available for mass production. The wire is attached to a mechanical structure that moves when the wire shrinks or expands back to its original size. This movement enables the closing and opening of the relay contacts. Such relays are opened or closed using a control voltage applied at both ends of the wire, thereby allowing a current to flow through the wire and heat it above its transition temperature. This property of the wire is what moves the electrical contacts in or out of engagement. These relays can have only a few millimeters in size. Consequently, large numbers of these relays can be provided on a single printed circuit board (PCB). A typical use for such hardware is for telecommunications.

The Nickel-Titanium alloy wire is a very difficult wire to handle. It is a very rigid and ductile wire that can not be bonded using traditional method like thermosonic, ultrasonic, weld, etc. Therefore, this wire needs to be mechanically attached using a mechanical attachment point hereby referred to as a "crimp". A further challenge is thus to be able to handle such difficult material when used in very small parts, especially when using very small lengths of wire with very small diameters. There is always a need for more compact designs that are less expensive, whether it is for a new relay or a micro pump to be used by the medical industry. In order to achieve this task, the manufacturing equipment need to be extremely precise and able to handle the wire very gently, so they do not alter its behavior, while being very fast to enable cost effectiveness. Such equipment did not exist.

Considering this background, it clearly appears that there was a need to develop a new apparatus for installing a length of wire between two crimps, in particular an apparatus capable of handling a delicate wire made of a material difficult to handle.

SUMMARY

A first aspect of the present invention is to provide an apparatus for installing a length of wire in a crimp, the apparatus comprising: a wire output guide; a crimp punch tool located in front of the wire output guide; a first actuator operatively connected to the crimp punch tool; a wire cutter tool adjacent to the crimp punch tool; and a second actuator operatively connected to the wire cutter tool.

A further aspect of the present invention is to provide a method of installing a wire in a crimp, the method comprising: positioning the wire coming out of a wire output guide into the crimp; punching the crimp to close it over the wire; and cutting the wire adjacent to the crimp.

A further aspect of the present invention is to provide a method of installing a length of wire between a first and a second crimp, the method comprising: positioning an end of a continuous wire extending out of a wire output guide in the first crimp; punching the first crimp to close it over the wire; moving the wire output guide away from the first crimp to pull some of the wire out of the wire output guide; positioning the wire in the second crimp; punching the second crimp to close it over the wire; and cutting the wire upstream of the second crimp.

These and other aspects of the present invention are described in or apparent from the detailed description, which description is made in conjunction with the accompanying figures.

DETAILED DESCRIPTION

The appended figures show an apparatus (10) for installing a wire (W) in accordance with the preferred embodiment. It should be understood that the present invention is not limited to this illustrated embodiment since various changes and modifications may be effected herein without departing from the scope of the appended claims.

Figure 1:
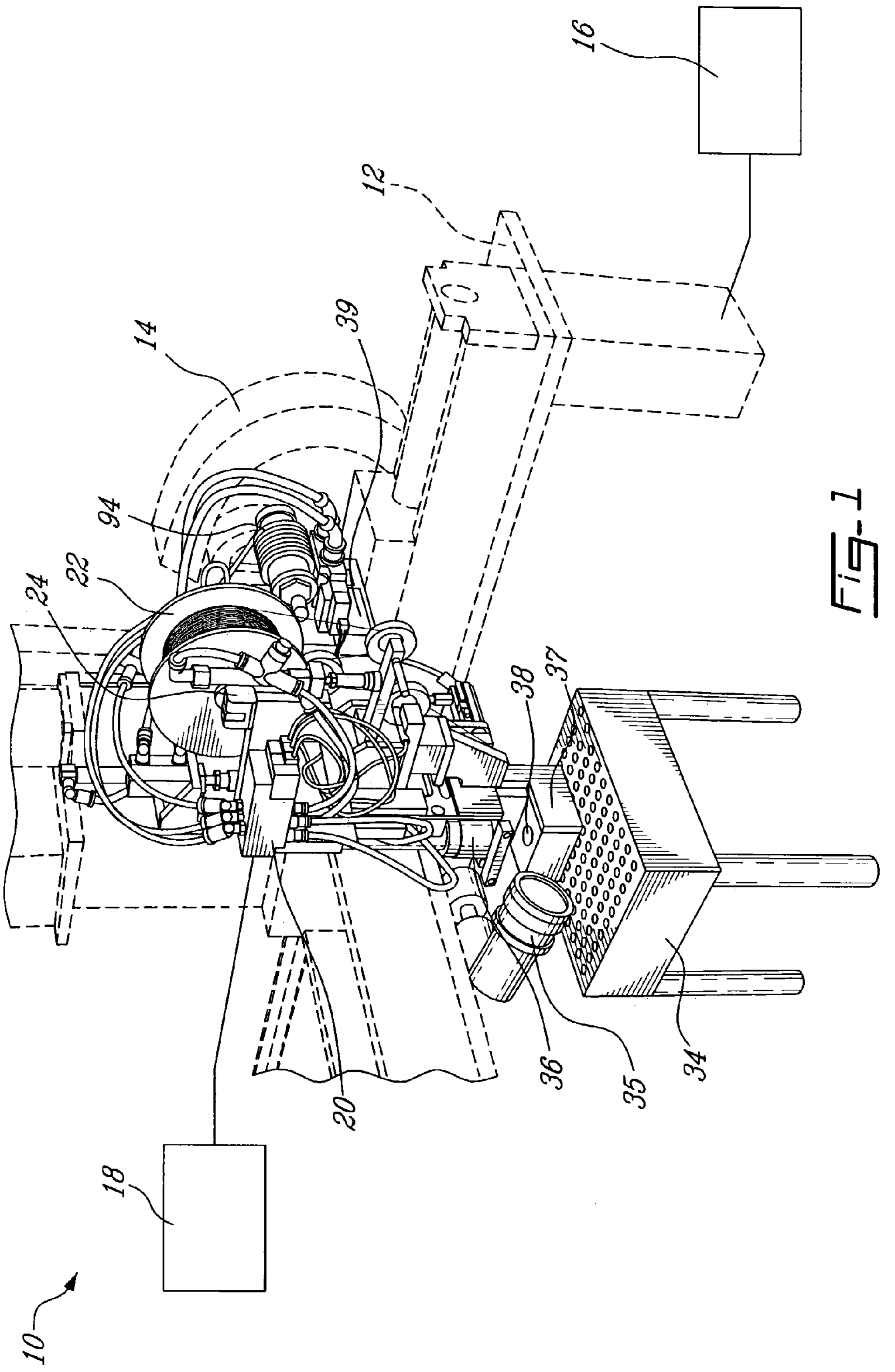
FIG. 1 is a perspective view of the apparatus in accordance with a preferred embodiment of the present invention.
Figure 2:
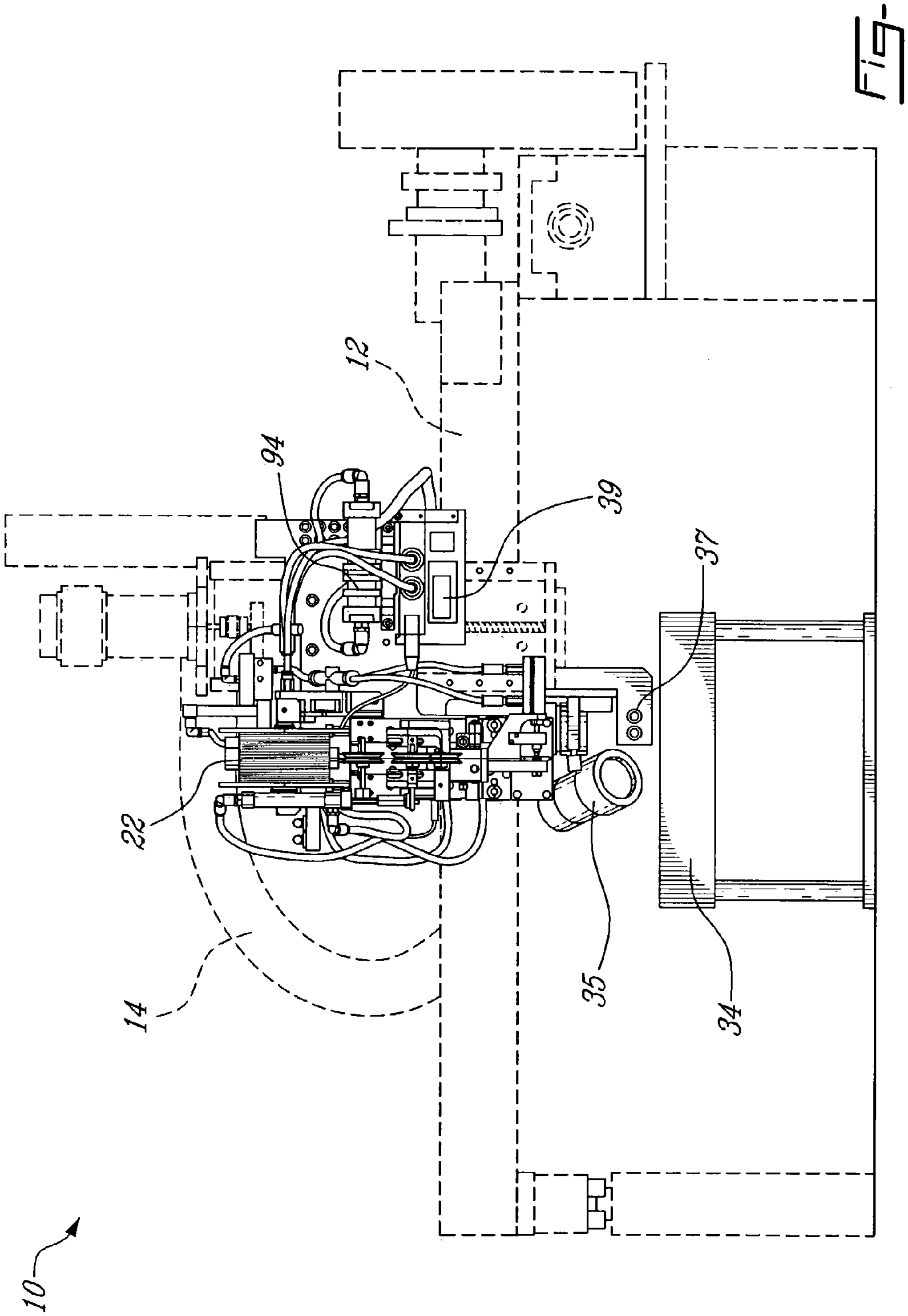
FIG. 2 is a front view of the apparatus shown in FIG. 1.

FIGS. 1 and 2 show that the apparatus (10) is preferably mounted on a high-precision 3D table (12) used to move it with three degrees of freedom, namely the X-Y-Z axes. The apparatus (10) and the 3D table (12) form a wire installation system. The 3D table (12) comprises motors to move a carriage on which the apparatus (10) is mounted. Flexible connection cables (14) allow the apparatus (10) to move within the operating space. An example of 3D table is the one sold by DCI automation, model number Galaxy 2050. Additional degrees of freedom can be provided if desired. For instance, the apparatus (10) may be able to rotate around a vertical axis if this is required for a more complex wire assembly. The apparatus (10) and the 3D table (12) are located in an enclosure with self-locking doors (not shown). It can also be located anywhere where it is out of reach of a supervising operator for safety reasons.

A computer (16) is used to control the operation of the apparatus (10) and the 3D table (12). Most of the operations of the apparatus (10) itself involve the use of pressurize air coming from a pneumatic source (18). Other actuation mechanisms could be used to replace pressured air, for instance a cam system, hydraulic systems, etc. A pneumatic valve package (20), shown in FIG. 1, allows the computer (16) to remotely control pneumatic actuators provided on the apparatus (10). The computer (16), among other things, further allows the operating parameters to be easily changed whenever necessary, thereby allowing the apparatus (10) to be highly versatile. For instance, it allows to easily changing the length of the wire (W) and the pattern of the wire lengths. The same apparatus (10) can be used for many applications.

The wire lengths installed by the apparatus (10) are preferably short sections of a continuous wire (W) coming from a wire spool (22) supplied by wire manufacturers. The spool (22) is mounted on the apparatus (10) using a spool holder (24). This spool holder (24) preferably comprises a horizontally-disposed spindle. Other arrangements are also possible.

Figure 3:
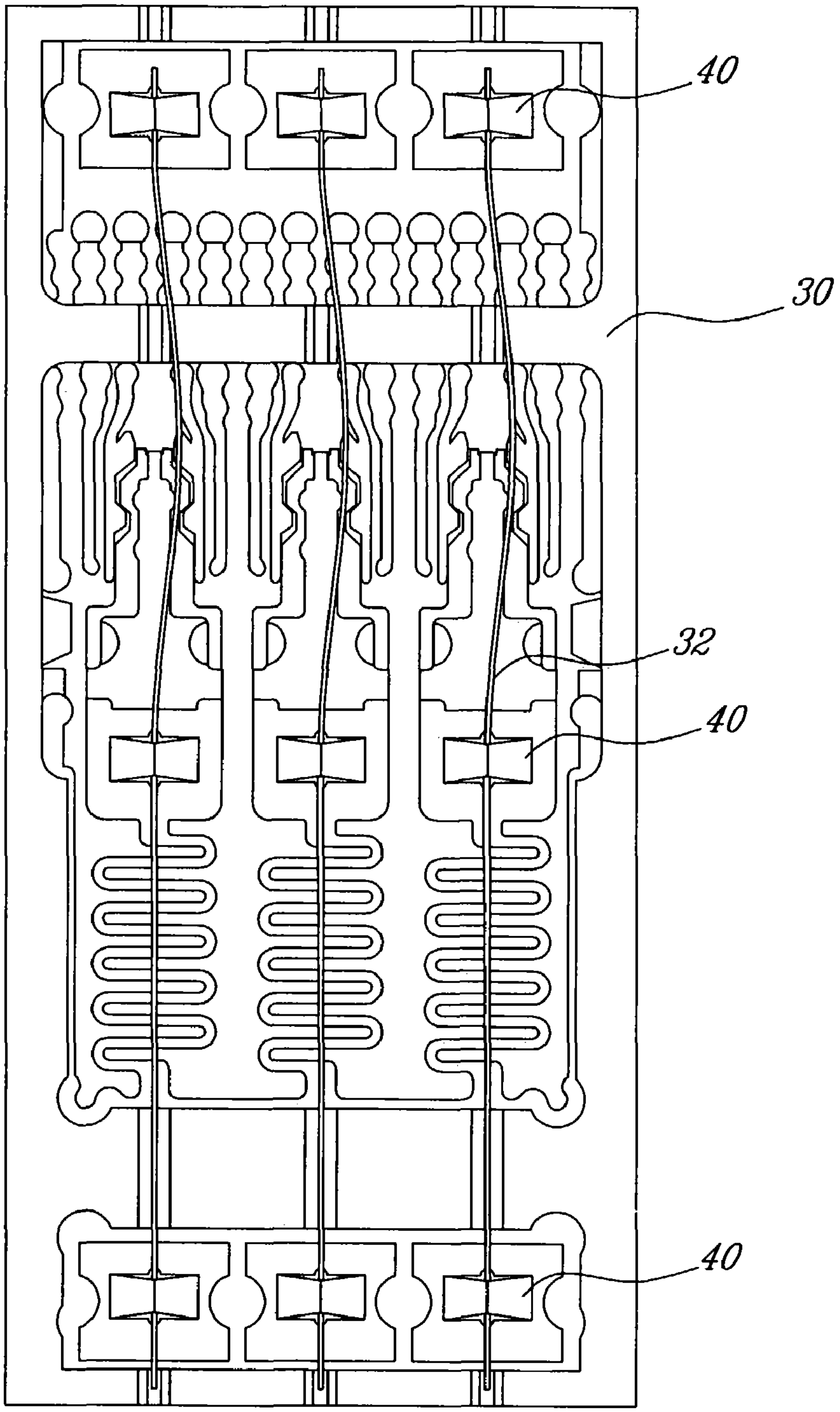
FIG. 3 is an upper view of three relays in which lengths of wire are installed using crimps, which crimps are part of the mechanical structure of the relays.

The apparatus (10) is used to install lengths of wire (W) between two crimps. The crimps may be mounted on a PCB or be part of a mechanical structure. An example of a mechanical structure (30) with crimps (40) is shown in FIG. 3. Examples of wire lengths (32) are shown. The mechanical structure (30) is maintained in place by an appropriate system during the wire installation process. FIGS. 1 and 2 show the retention system of the mechanical structure (30) being a table, for instance a standard vacuum table (34). Other mechanical retention systems are also possible. It should be noted that it is further possible that the apparatus (10) be fixed and that the retention system be movable.

Although the wire primarily targeted with the present invention is a heat-shrinkable wire, for instance one made of a Nickel-Titanium alloy and used to manufacture diverse component such as small relays, it should be noted that other types of wires can be used with the apparatus (10). Furthermore, the wire lengths (32) can be installed almost anywhere.

Referring back to FIGS. 1 and 2, an inspection system, comprising a camera (35), can be provided to allow an operator to see how the wire installation progresses. The apparatus (10) of the preferred embodiment also comprises a visual positioning system using a camera (36) to locate reference points on the 5 mechanical structure (30). This positioning system comprises a DOAL® (37); which consists of an illumination system using internal LEDs and a splitting mirror. An aperture (38) on the DOAL® (37) allows the camera (36) to see the reference points on the mechanical structure (30). The camera (36) is connected to the computer (16).

Advantageously, a counter (39), for instance a LCD counter, is provided on the apparatus (10) to monitor the number of lengths of wire (W) being installed in order to perform required preventive maintenance. The counter (39) may otherwise be integrated within the-computer (16). The advantage of having a separate counter (39) on the apparatus (10) itself is that it is not affected by a change of computer or in case of a lost of data resulting from a problem at the computer (16).

Figure 4:
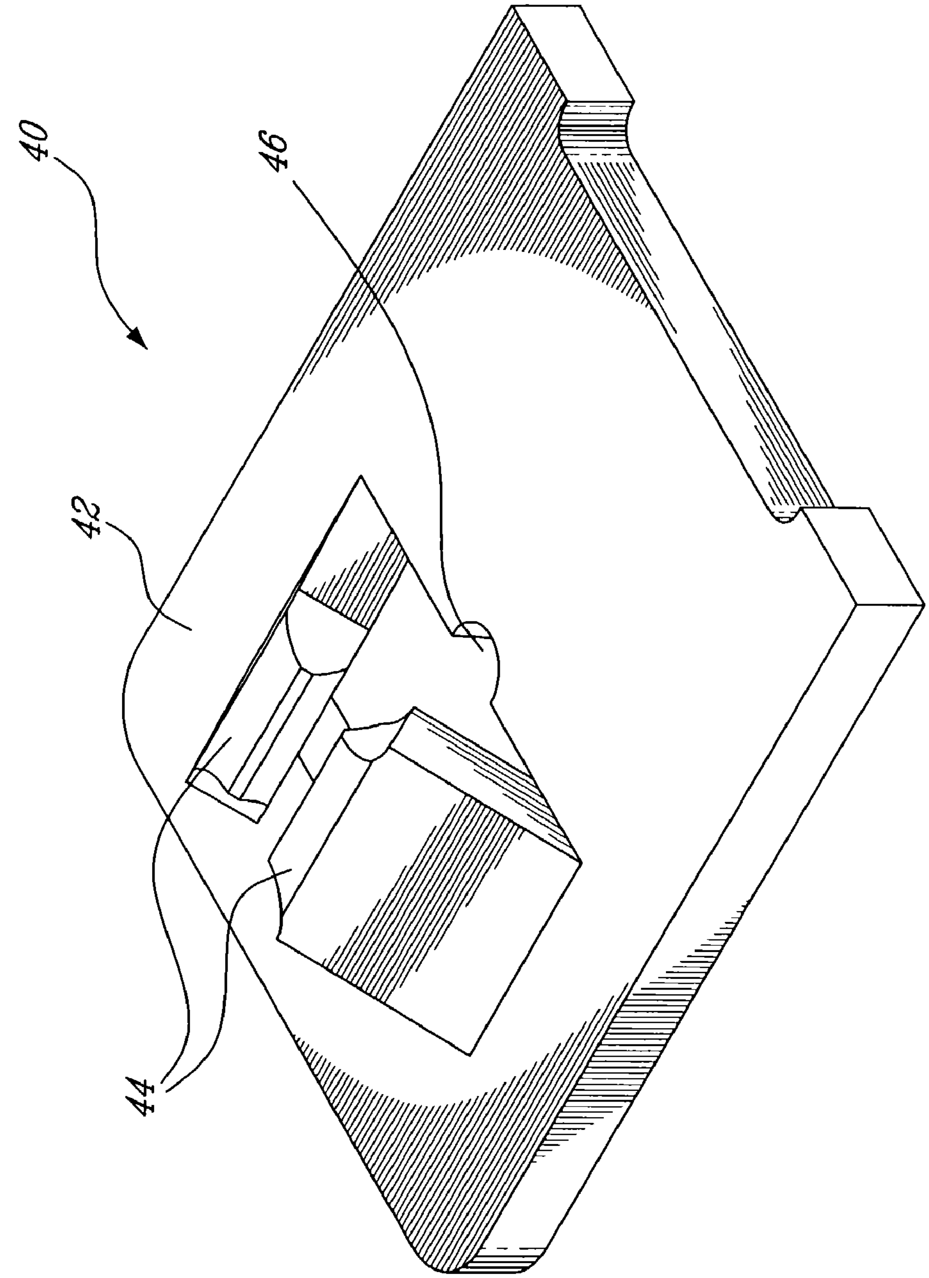
FIG. 4 is a perspective view of a crimp in accordance with a first possible embodiment.
Figure 5:
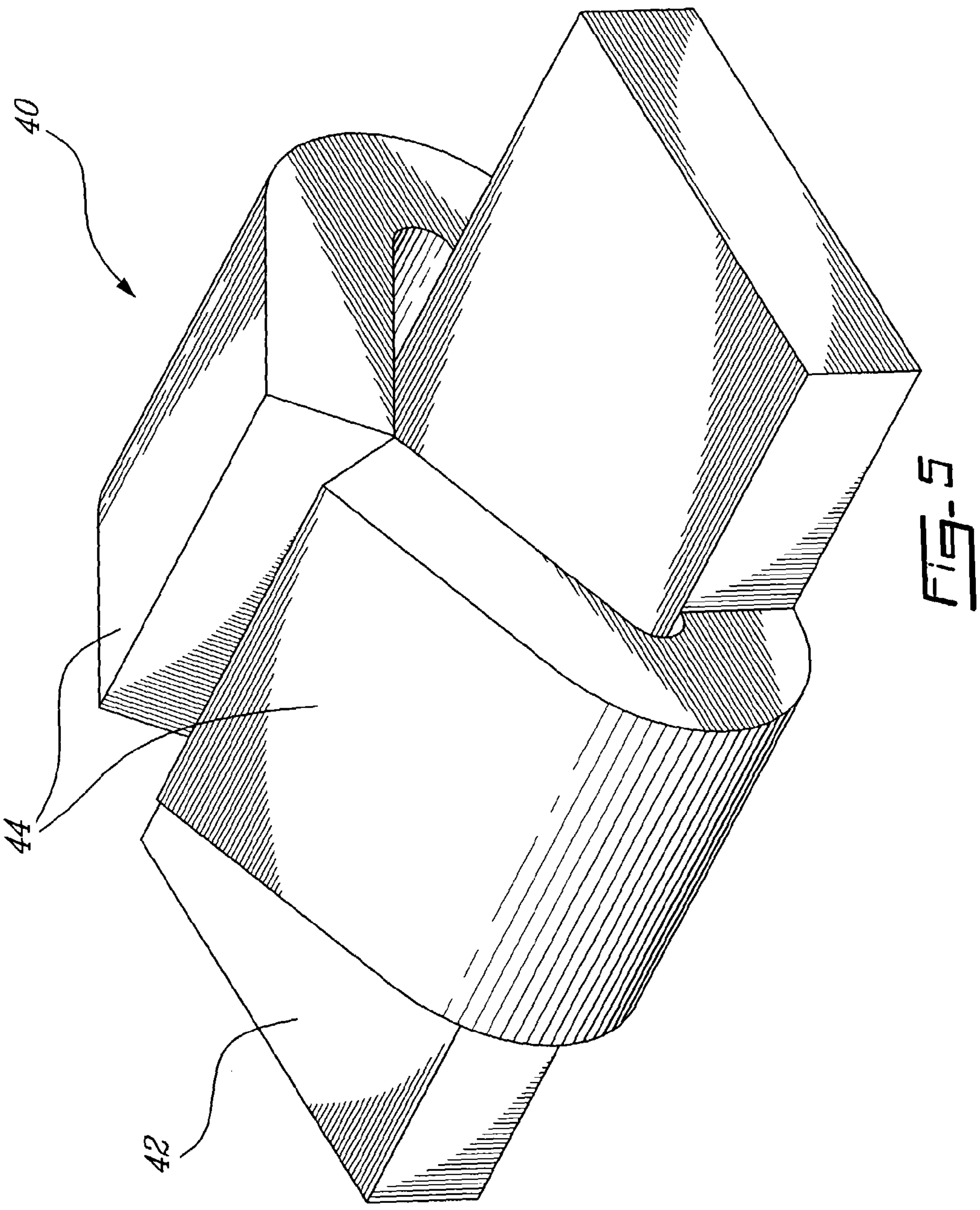
FIG. 5 is a perspective view of a crimp in accordance with a second possible embodiment.

Examples of crimps (40) are shown in FIGS. 4 and 5. Many other crimps models are possible. The wire (W) is installed and cut between the crimps (40) as required. One or more intermediary crimps (40) may be used, as with the mechanical structure (30) shown in FIG. 3. A crimp (40) is a base part (42) made of a relatively hard material. It has one or more flaps (44). In FIG. 4, the crimp (40) is designed so that both flaps (44) are initially spaced apart to allow the wire (W) to pass between them. The wire (W) will be retained under the two flaps (44). Two opposite holes (46) are centered with reference to the opening created by the flaps (44) so as to prevent the rim of the opening from severing the wire (W) when closing the crimp (40). In the case of the crimp (40) of FIG. 5, the ends of the two flaps (44) are closely spaced. The wire (W) initially rests on these ends. Punching the crimp (40) will bring the two flaps (44) downwards with the wire (W) being pressed between both ends. It should be noted that other kinds of crimps can be used as well, including crimps with only one flap.

Figure 6:
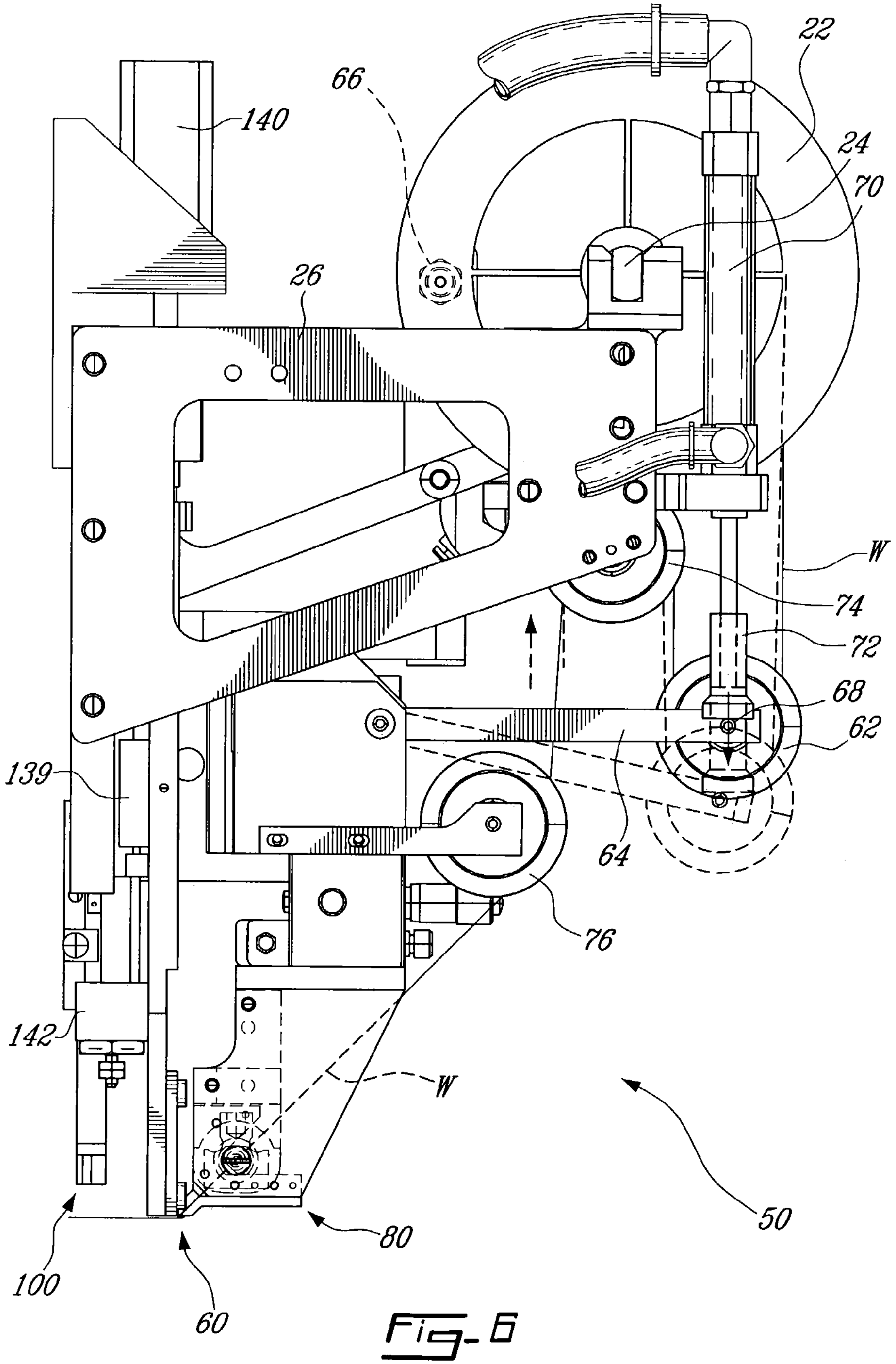
FIG. 6 is an enlarged side view of the lower end of the apparatus shown in FIG. 1.

FIG. 6 shows that the spool holder (24) is held by a bracket (26). It also shows the wire tension mechanism (50) of the apparatus (10) in accordance with the preferred embodiment. This mechanism (50) is located between the spool holder (24) and a wire output guide (60). The mechanism (50) is very useful for increasing the speed of the apparatus (10) to an optimum level.

The wire tension mechanism (50) is passive, meaning that the wire (W) is not forced through the wire output guide (60). On the contrary, when the apparatus (10) moves from one location to another, it will pull on the wire (W), which is crimped at the previous location. The wire tension mechanism (50) is rather used for two different functions. Firstly, it will dispense the length of wire (W) required for the next installation and secondly, it will ensure that when the apparatus (10) moves along its three axis at high speed, the wire (W) is not over stressed. The loose wire (W) will be pulled with a substantially constant tension for the complete dispensed length.

Figure 7:
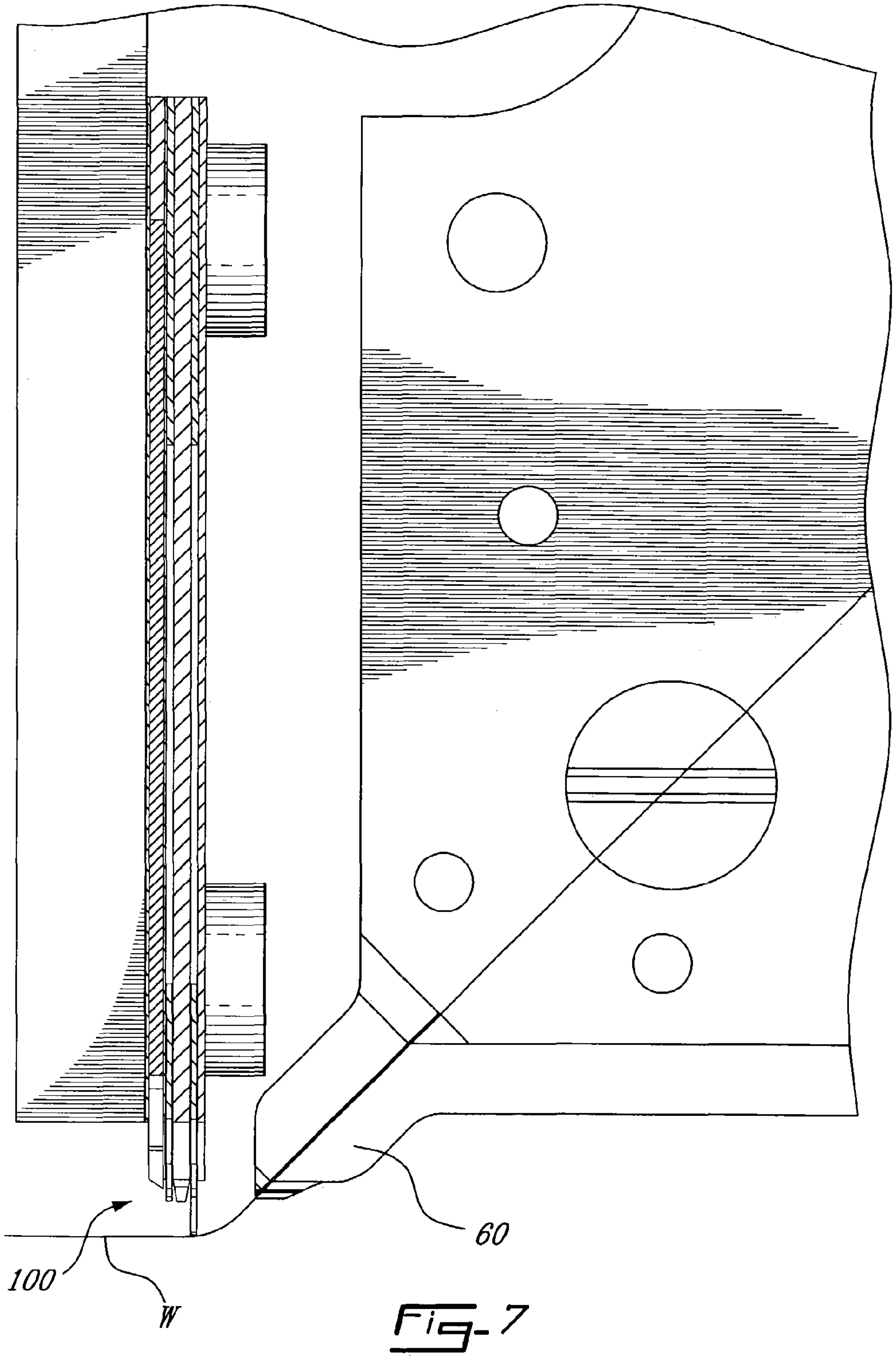
FIG. 7 is an enlarged side view of the wire output guide and the punch stack assembly shown in FIG. 6.
Figure 8:
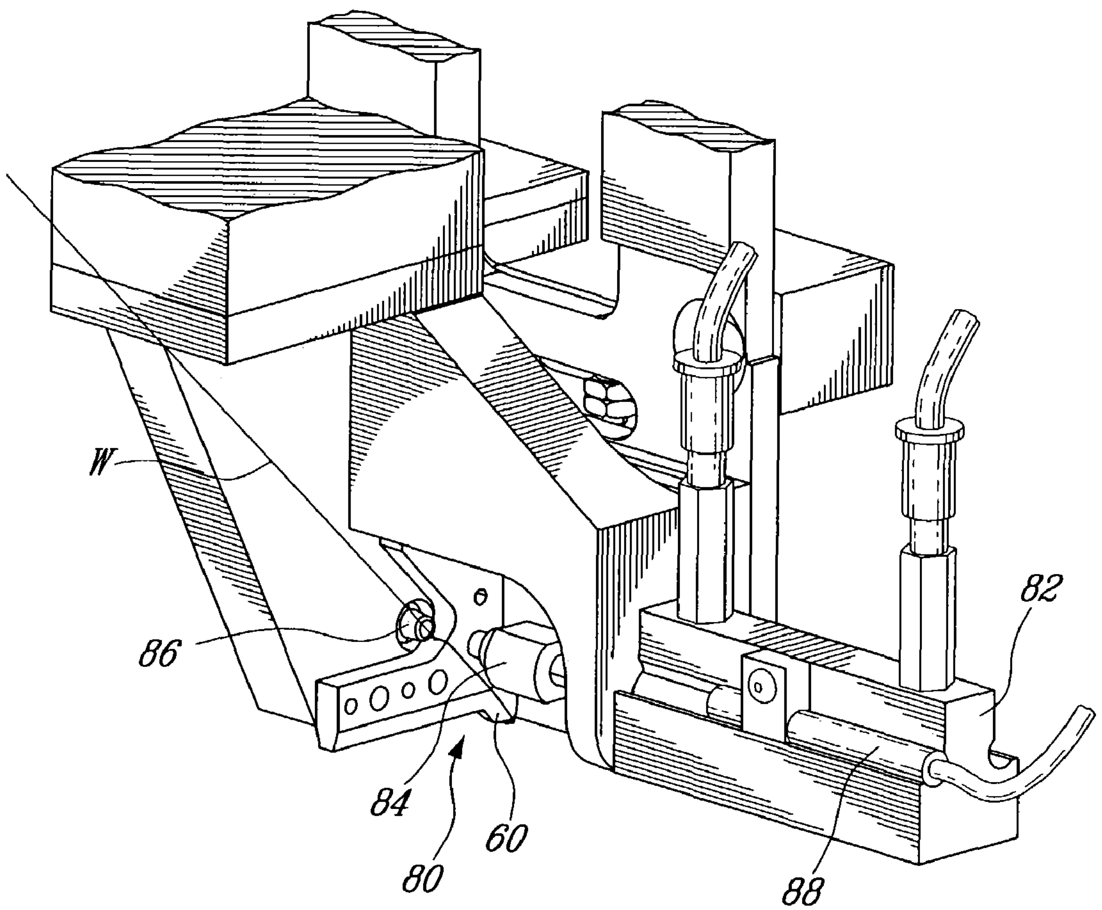
FIG. 8 is an enlarged side view of the wire gripper used in the apparatus shown in FIG. 1.

FIG. 7 shows an enlarged view of the wire output guide (60) and the side of a section referred to as the punch stack assembly (100). The opposite side of the wire output guide (60) is shown in FIG. 8. The wire output guide (60), as its name indicates, is the location where the free end of the continuous wire (W) is located. It comprises an internal channel in which the wire (W) is inserted. This channel is preferably created by a groove etched on the edge of a first member. A second member, also etched, is then positioned over the edge of the first member, thereby creating the channel.

Although a wire (W) made of a Nickel-Titanium alloy is very fragile, it is nevertheless likely to damage the wire output guide (60) over time because the wire (W) is in sliding contact with it. The wire (W) is highly abrasive and small. It can thus cut through a relatively soft material. For this reason, the wire output guide (60) is preferably made of a highly resistant material such as carbide. Other similar materials can be used as well.

Referring back to FIG. 6, the wire (W) from the spool (22) is first directed to a first pulley (62) located at the end of a swing arm (64). The first pulley (62) is configured and disposed so that the combined weight of the first pulley (62) and its swing arm (64) applies a tension in the wire (W) on the spool (22). This works in combination with a spool brake (66), for instance one using an adjustable friction pad engaged on one of the sides of the spool (22). The tension generated by the spool brake (66) will typically be about ⅔ the maximum tension force the wire (W) can support. The tension generated by the first pulley (62) and its swing arm (64) is smaller than the spool brake (66) and much smaller than the typical maximum tension force that the wire (W) can support.

In use, the wire (W) is pulled through the wire output guide (60) when the apparatus (10) is moved with reference to the mechanical structure (30) with the free end of the wire (W) being held in a crimp (40). The difference in the tension from the spool brake (66) with reference to that of the first pulley (62) and its swing arm (64) causes these last ones to be moved up before the spool (22) is rotated, thereby ensuring a constant tension in the wire (W) during installation. The apparatus (10) of the preferred embodiment is designed so that the movement of the first pulley (62) and its swing arm (64) is enough to provide at least one length of wire (W). Then, usually between two lengths of wire (W) being installed, some wire (W) is pulled out of the spool (22) by pushing down on a side pin (68) located on the side of the first pulley (62) using a dedicated actuator (70). The free end of the actuator (70) preferably comprises a pad (72) to soften the contact with the side pin (68). After its stroke, the pad (72) of the actuator (70) moves out of engagement with the side pin (68) so that the first pulley (62) and its swing arm (64) are free to move in an unrestrictive manner.

Figure 9:
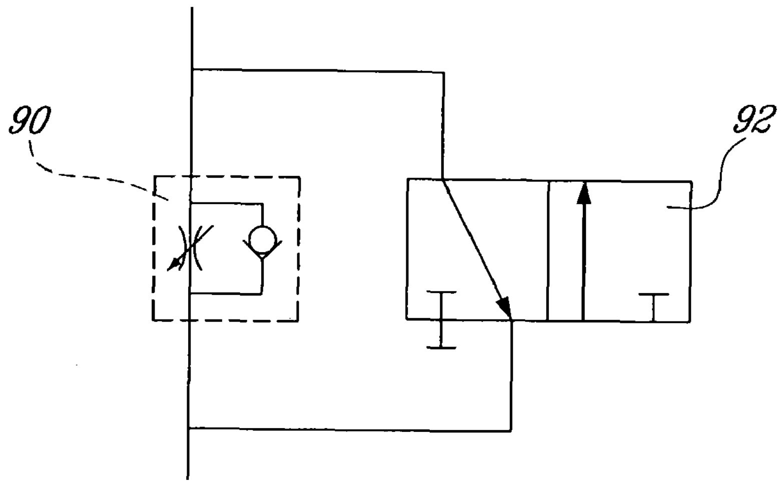
FIG. 9 is a schematic view of a bypass valve and a flow regulator arrangement.

As shown in FIGS. 6 and 8, the wire (W) is preferably sent from the first pulley (62) to a second pulley (74) and then a third pulley (76). The second pulley (74) and the third pulley (76) are preferably held at a fixed location. From the third pulley (76), the wire (W) is directed to the inlet of the wire output guide (60). A gripper (80) is located upstream of the wire output guide (60). The gripper (80) comprises a horizontally disposed pneumatic actuator (82) having a movable free end (84) capable of squeezing the wire (W) on a seat (86) located immediately upstream of the wire output guide (60). Because the wire (W) may be very fragile, the actuator (82) of the gripper (80) preferably comprises a system for controlling the impact on the wire (W). This system preferably comprises a positioning sensor (88) located on the actuator (82). This positioning sensor (88) generates a signal indicative of the position of the free end of the actuator (82). Before entering the actuator (82), pressurized air first comes from a flow regulator (90), shown in FIG. 9, which lowers the speed of the pressure built up so that the movable part speed is controlled. Then, a bypass valve (92), also shown in FIG. 9, is opened when the free end of the movable part of the actuator (82) is close to the seat (86). Normal pressure is then quickly supplied to the actuator (82). This technique allows preventing the movable part of the actuator (82) from getting to much speed while still allowing the actuator (82) to operate at the normal pressure for retaining the wire (W). The free end (84) of the movable part, as well as the seat, which contact the wire (W), are preferably made of a highly resistant material such as carbide to prevent premature wear thereof. The flow regulator (90) and the bypass valve (92) can also be positioned at the exhaust of the actuator (82) and perform the same behavior.

An air accumulator (94), shown in FIGS. 1 and 2, is provided on the apparatus (10) to increase the efficiency of the supply from the pneumatic source (18). This improves the overall speed compared to the case where all the air pressure needs to come directly from the air supply to build pressure. The air accumulator (94) recharges continuously but can reach the maximum capacity when enough time is provided, for instance when the apparatus (10) is repositioned with reference to the mechanical structure (30).

Figure 10:
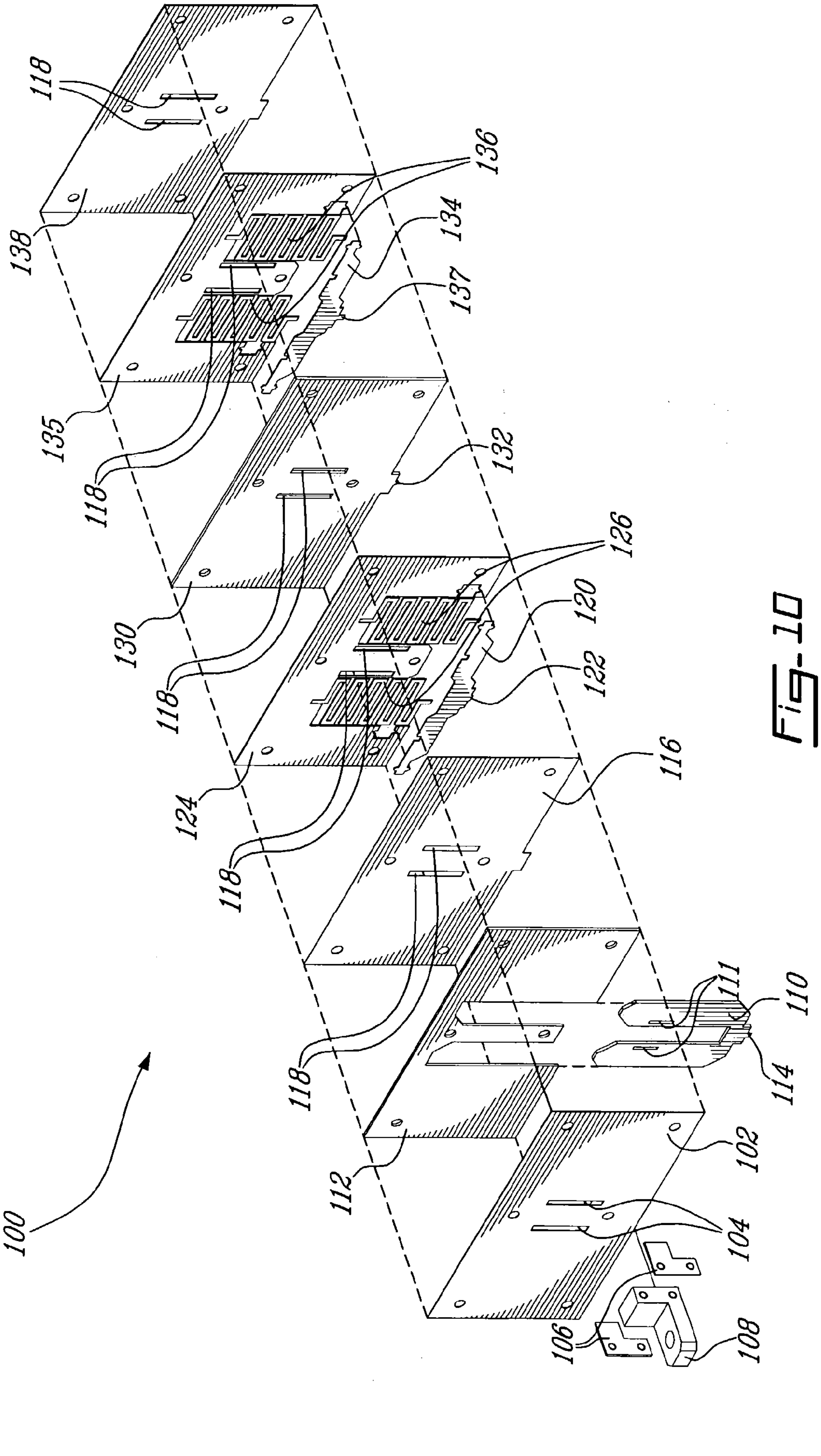
FIG. 10 is an exploded view of the punch stack assembly used in the apparatus shown in FIG. 1.

FIG. 10 shows the various parts of the punch stack assembly (100) used in the apparatus (10) of the preferred embodiment. These parts are tools used for positioning the wire (W), closing the crimp (40) and cutting the wire (W). They are preferably designed as plates fitting one over the other. This provides a very compact and efficient design.

The first plate is a first cover (102). It comprises a pair of elongated slots (104). The slots (104) are designed to receive the end of corresponding levers (106). Both levers (106) are connected to a bracket (108). The levers (106) and the brackets (108) allow operating a cutter tool (110) that is located next to the first cover (102). The cutter tool (110) is in sliding engagement with the first cover (102) and comprises the two slots (111) for tightly receiving the ends of the levers (106). The cutter tool (110) is vertically guided by a cutter plate (112). It comprises a cutting tip (114) made of a highly resistant material, such as carbide or the like. A spacer plate (116) is located on the opposite side. Like all other plates, it also comprises the pair of elongated slots (118) for allowing the end of the levers (106) to move freely in the vertical axis.

The punch stack assembly (100) preferably comprises one or more wire retainer tools. The first wire retainer tool (120) is optional. It is referred to as the "short retainer tool". It has a bottom tip (122) designed to engage the top of the wire (W) and position it on one side of the crimp (40). This side is referred to as the "downstream side" with reference to the wire output guide (60). The first wire retainer tool (120) is connected to a corresponding retainer plate (124) by means of two flat springs (126).

The next plate is the punch tool (130). The punch tool (130) has a punch tip (132) at the bottom. The punch tip (132) is designed to hit the top of the flaps (44) of the crimps (40) so as to bring them to their closed position. A second wire retainer tool (134) and a corresponding retainer plate (135) are located on the opposite side of the punch tool (130). The second wire retainer tool (134) is also connected to a pair of springs (136). It is designed with a longer tip (137) than that of the first wire retainer tool (120), if any is provided. The function of the second wire retainer tool (134) is to adequately position the wire (W) on the side where it is cut. This side is referred to as the "upstream side". A second cover plate (138) completes the punch stack assembly (100).

It should be noted that the exact location of the plates and tools might be different than that shown and described. For instance, depending on the desired functions, the retainer "short" and/or "long" can be positioned on either side. A retainer can also be used as a bending tool depending on its shape and length. Furthermore, it is possible to locate the cutter tool (110) outside the punch stack assembly (100).

The punch stack assembly (100) is slidably mounted in the apparatus (10) by means of a sliding guide (139), as best shown in FIG. 6. It is moved vertically by means of a first pneumatic actuator (140). The operation of the punch stack assembly (100) is achieved in one stroke. Therefore, the positioning and crimping steps occur almost at the same time. The tips (122,137) of the first and the second wire retainer tools (120,134) are positioned so that they engage and position the wire (W) before the tip (132) of the punch plate tool (130) hits the crimp (40). They also retain the wire (W) during the punch. The springs (126,136) of the first and the second wire retainer tools (120,134) can compensate, if required, for the difference in height between them and the punch tool tip (132).

Cutting the wire (W) is not required each time a crimp (40) is closed. For this reason, the cutter tool (110) is independently operated using a second pneumatic actuator (142), shown in FIG. 6. The second actuator (142) is preferably mounted on the side of the punch stack assembly (100) itself and thus moves with it upon operating the first actuator (140).

FIGS. 11 to 14 show various steps of the wire installation process using the crimp (40) of FIG. 4.

Figure 11:
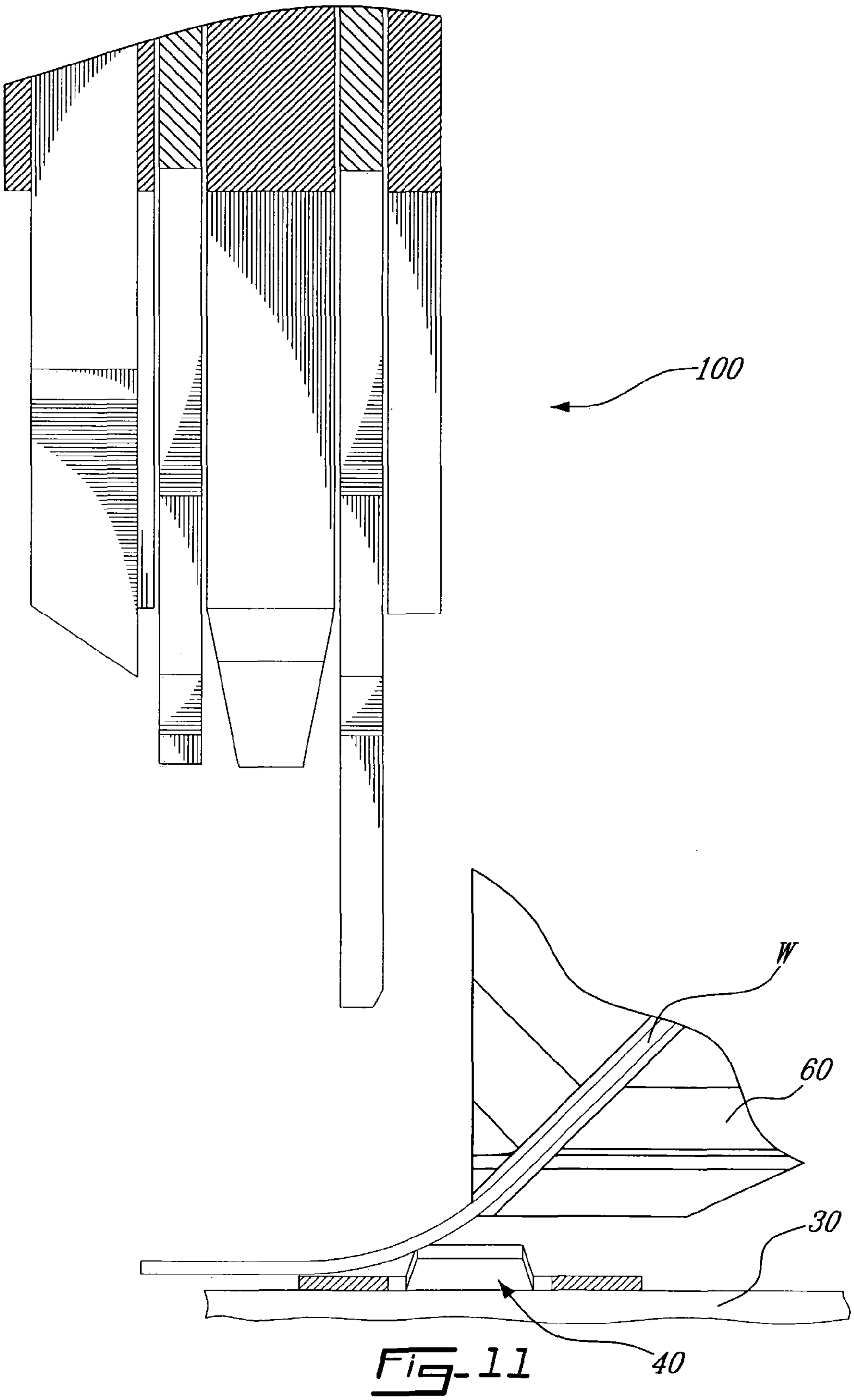
FIGS. 11 to 14 show various steps of the wire installation method using the crimp of FIG. 4.

In FIG. 11, the wire (W) is being laid over the crimp (40). If the crimp (40) is the first one of a set, a small section of wire (W) initially protrudes from the wire output guide (60). This is either the result of a manual positioning when a new spool (22) is installed or, more likely, a section left after a previous installation. If it is another crimp (40) of a set, the free end of the wire (W) would now be connected to another crimp (40). Retracting the gripper (80) and moving the apparatus (10) relative to the mechanical structure (30) pulls additional wire (W) out of the wire output guide (60). Prior to moving back to the crimp (40), the gripper (80) has to be activated to grip the wire (W) so that the wire (W) will not return back inside the wire output guide (60). Movement then continues until the punch stack assembly (100) is aligned with the crimp (40). An extra amount of wire (W) can be pulled prior to activating the gripper (80) so that there is loose wire (W) between the two crimps (40).

Figure 12:
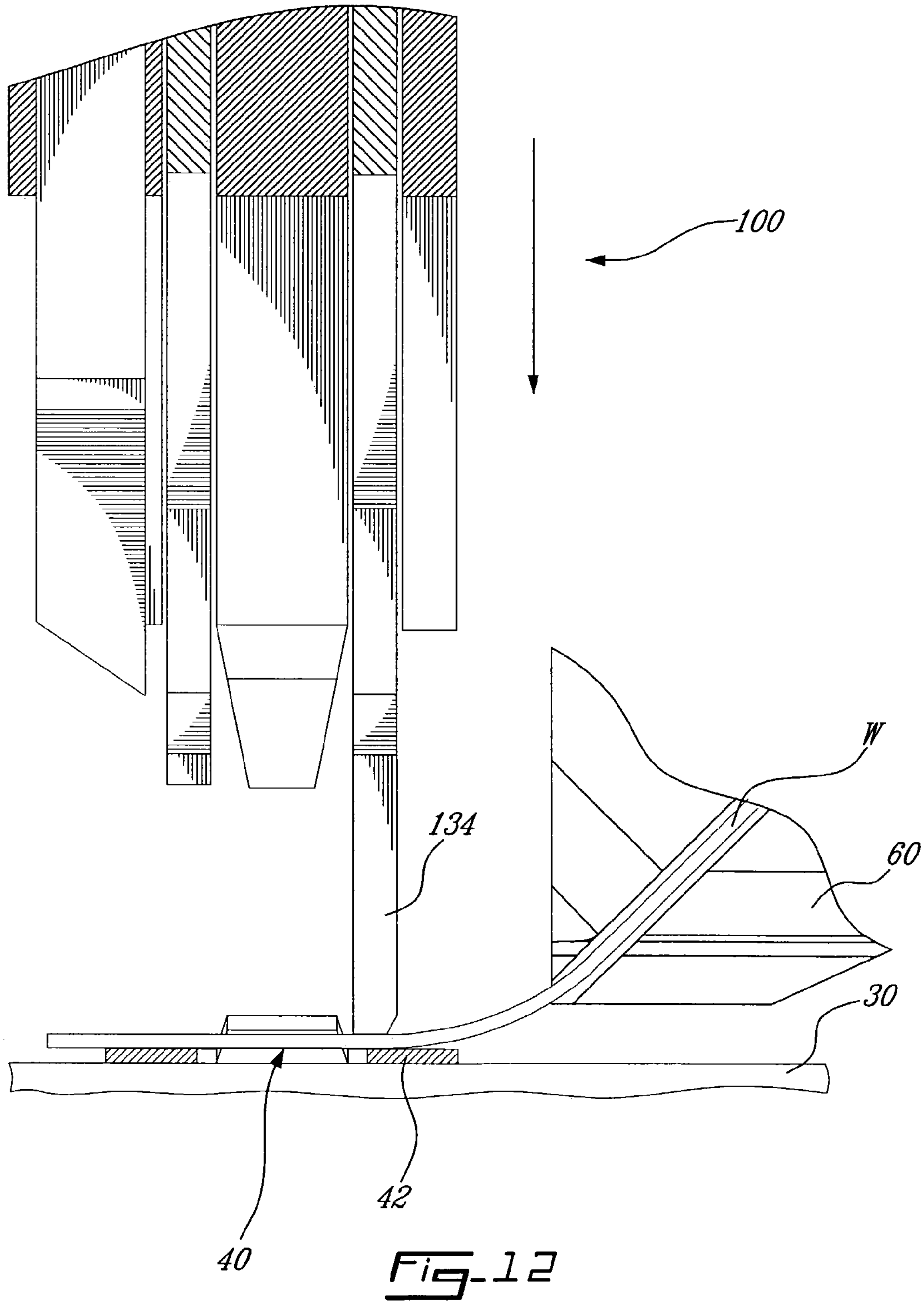

In FIG. 12, the punch stack assembly (100) is moved downwards by operating the first actuator (140). The second wire retainer tool (134), since it is longer, engages the wire (W) first. It brings it to the base (42) of the crimp (40), namely to the bottom of the crimp (40), as required by the design.

Figure 13:
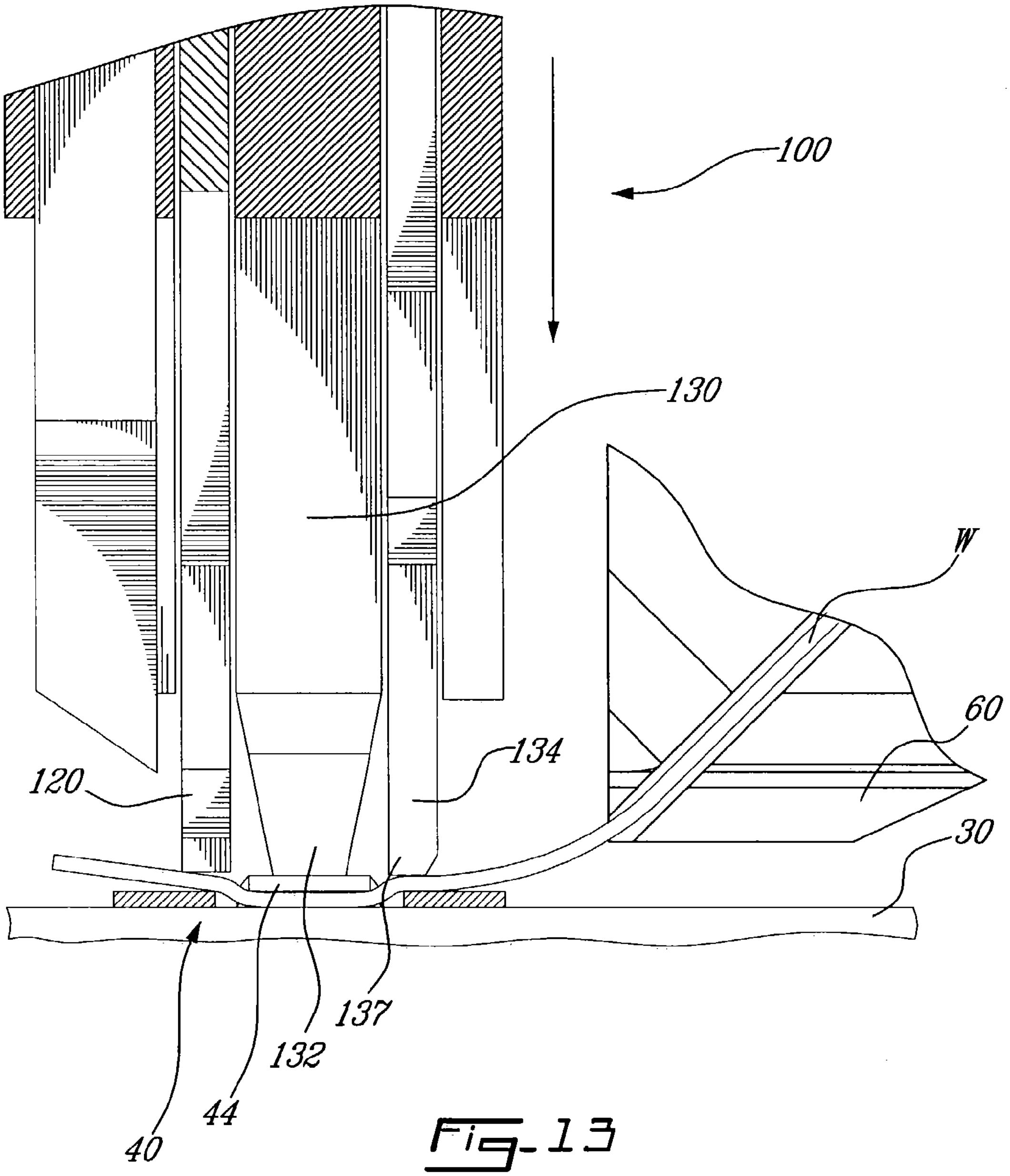

In FIG. 13, the punch stack assembly (100) has moved to the bottom end of its stroke. At that point, the tip (132) of the punch plate tool (130) closed the flaps (44) of the crimp (40) over the wire (W). The first wire retainer tool (120) is provided to keep the corresponding side thereof at the bottom of the crimp (40).

Figure 14:
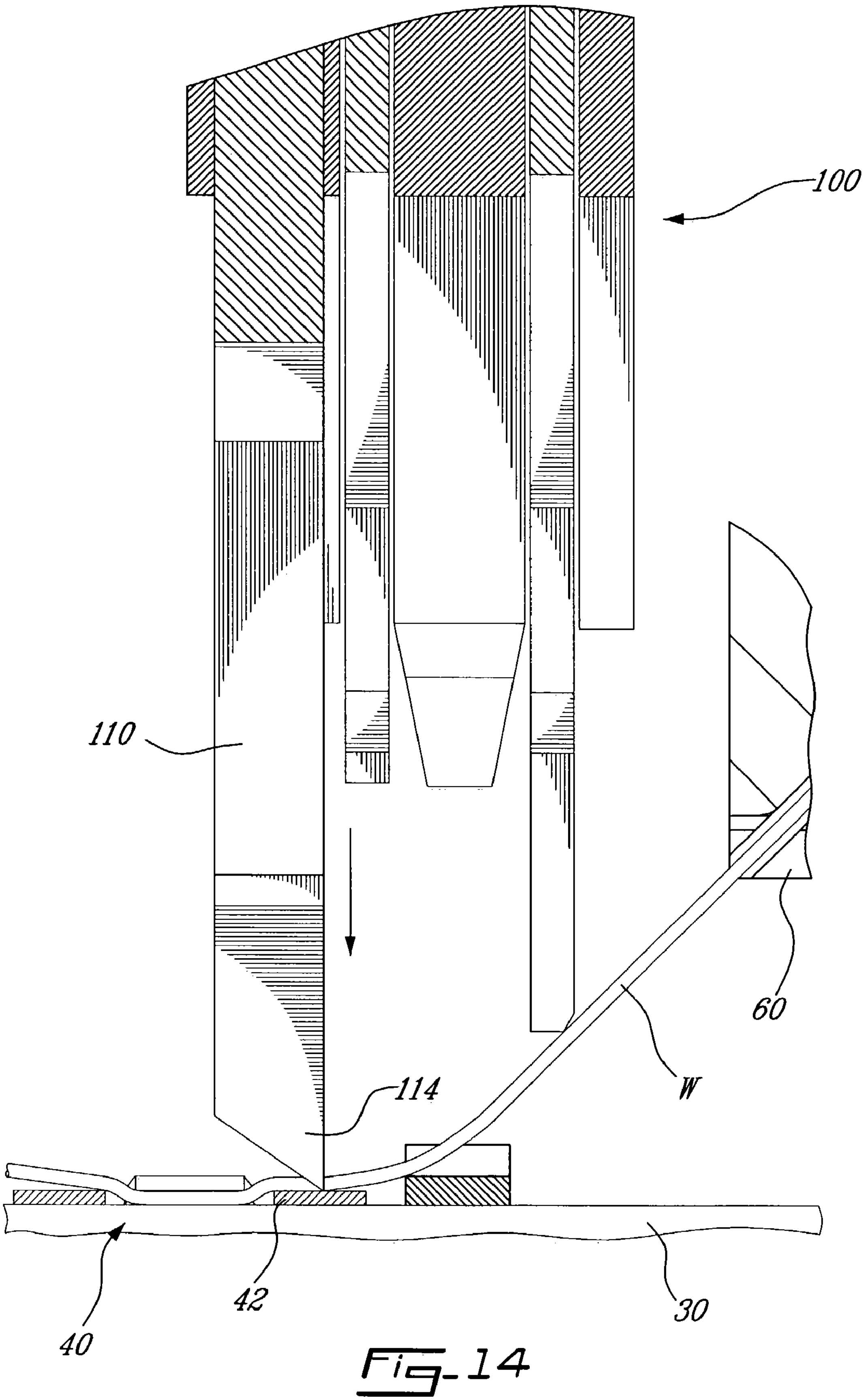

In FIG. 14, the wire (W) is being cut by the cutter tool (110). This occurs when the last crimp (40) of a set was closed. The apparatus (10) was repositioned with reference to the mechanical structure (30) immediately prior to the cutting. However, other designs may avoid this repositioning. Cutting occurs when the second actuator (142) is operated so as to bring the cutting tip (114) in engagement with the wire (W). The cutting is preferably achieved on the base (42) of the crimp (40) and while the wire (W) is gripped by the gripper (80). The advantage of ending the stroke in the base (42) of the crimp (40) is that it will stop the cutting tip (114) in its relatively softer material, thereby preventing rapid wear of the cutting tip (114). Advantageously, the second actuator (142) is operated twice or more to ensure that the wire (W) is effectively cut.

Figure 15:
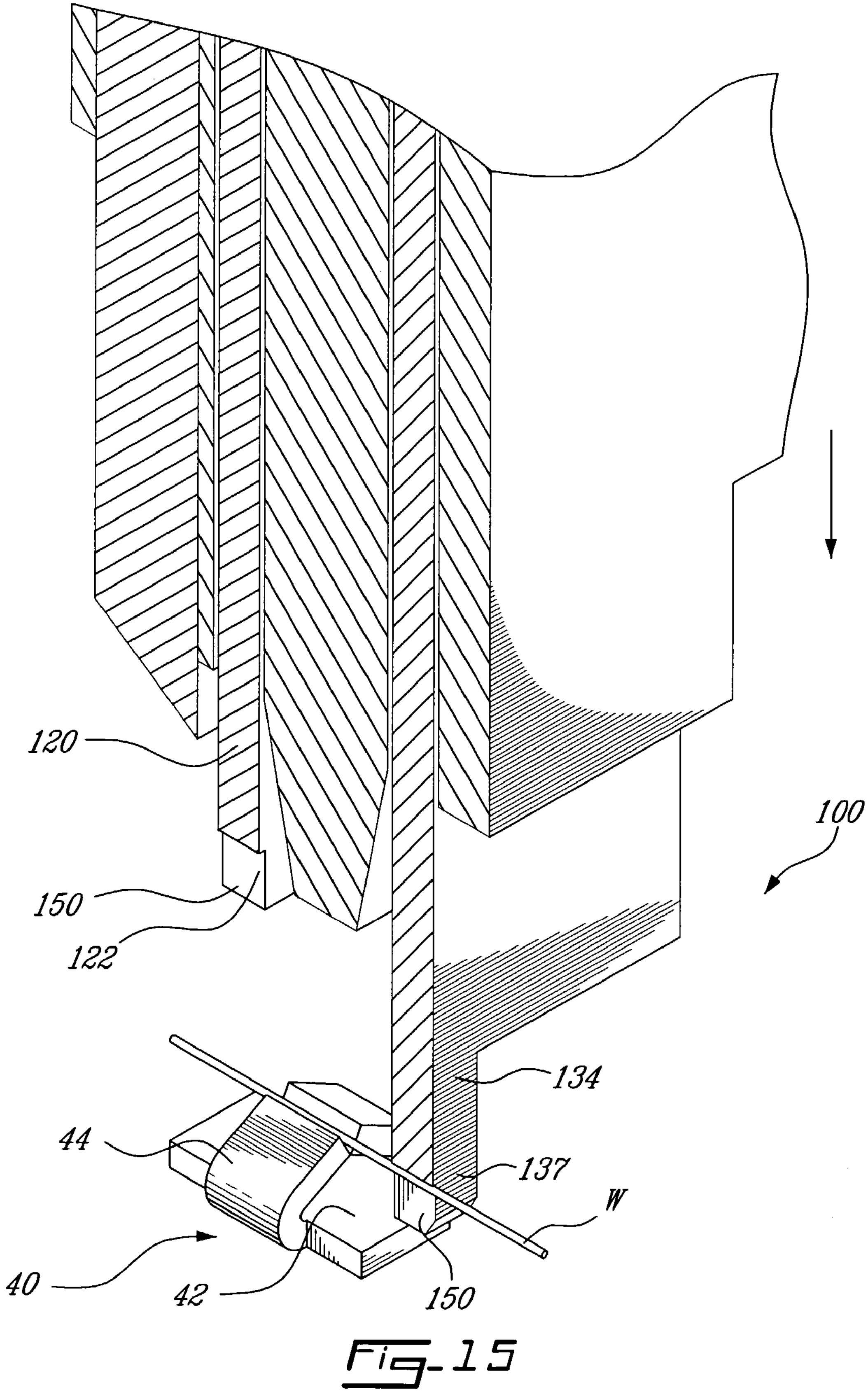
FIGS. 15 to 17 show various steps of the wire installation method using the crimp of FIG. 5.
Figure 16:
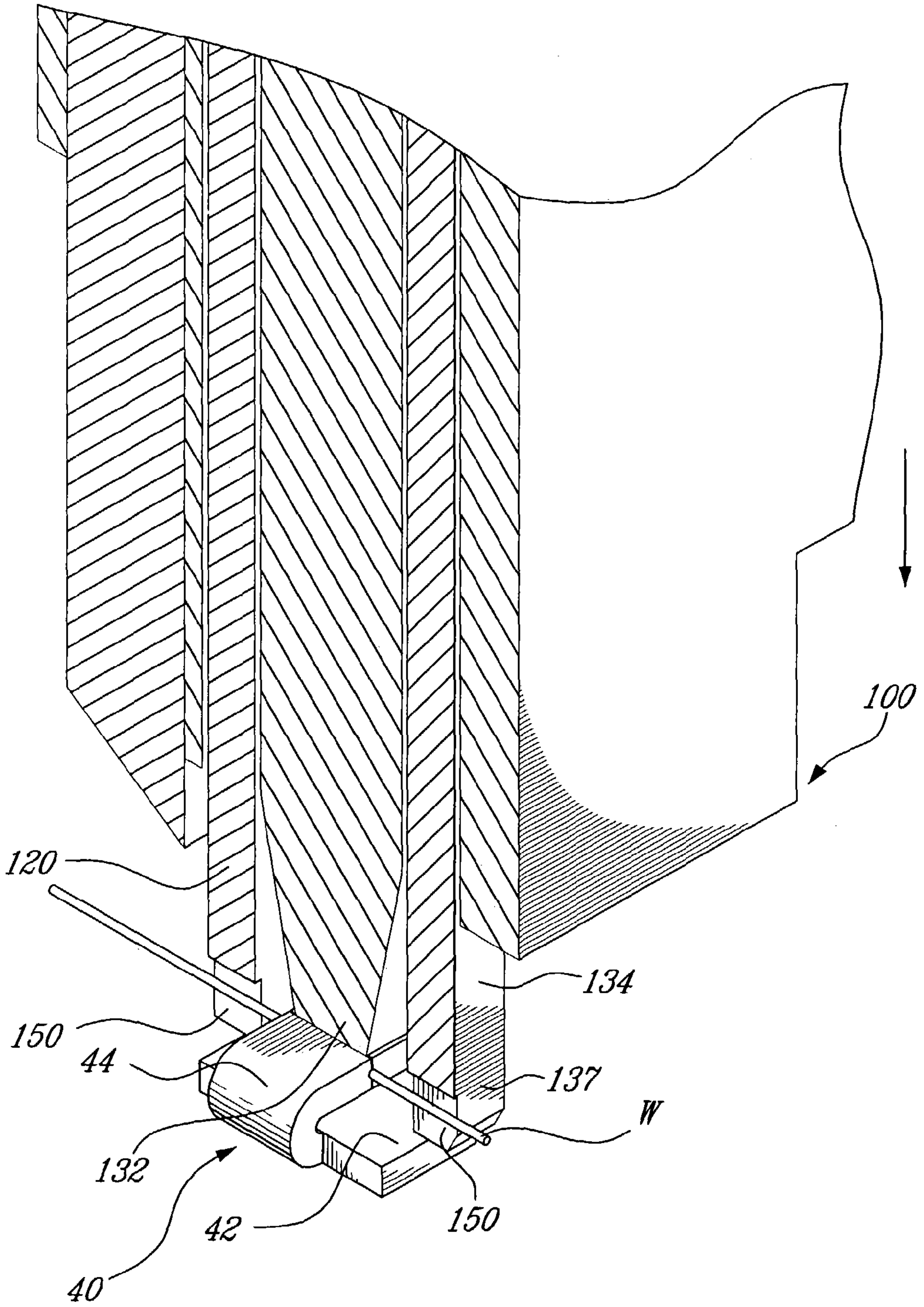
Figure 17:
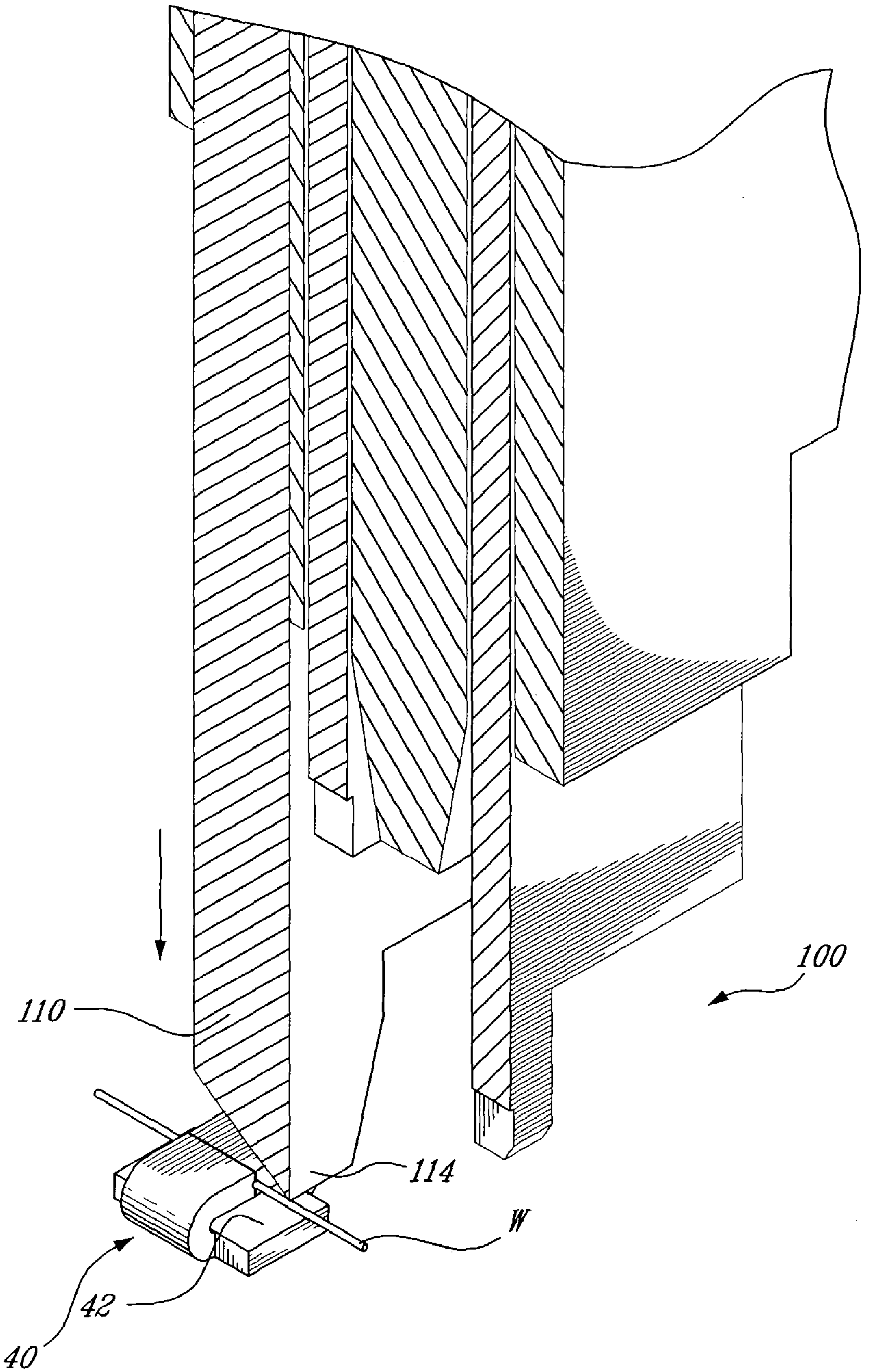

FIGS. 15 to 17 show various steps of the wire installation process using the crimp (40) of FIG. 5. The process is similar to that of FIGS. 11 to 14, with the exception that the wire (W) is not positioned at the bottom of the crimp (40).

In FIG. 15, the two wire retainer tools (120,134) include a slot (150) at the bottom of which the wire (W) is retained. Their respective tips (122,137) are then allowed to contact the base (42) of the crimp (40).

In FIG. 16, the punch stack assembly (100) has moved to the bottom end of its stroke. At that point, the tip (132) of the punch plate (130) closed the flaps (44) of the crimp (40), trapping the wire (W) in the gage of the crimp metal flaps (44).

FIG. 17 shows the cutting tip (114) being in movement to cut the wire (W).

As aforesaid, the apparatus (10) allows to install a length of wire (W) between two crimps (40) but a third crimp (40), and possibly more than one additional crimp, can be present between the two crimps (40) at the ends. In this case, the wire (W) would be installed in the intermediary crimp without being cut afterwards. The apparatus (10) would continue towards the final crimp (40) before the wire (W) is cut.

What is claimed is:

1. An apparatus for installing a length of wire between two crimps, the apparatus comprising:

a wire output guide;

a crimp punch tool located in front of the wire output guide;

a first actuator operatively connected to the crimp punch tool;

a wire cutter tool adjacent to the crimp punch tool;

a second actuator operatively connected to the wire cutter tool; and a wire gripper including:

a wire gripper actuator having a movable part with a free end, the movable part being selectively movable between an elongated position and a retracted position, wherein the wire gripper actuator is a pneumatic linear actuator connected to a pneumatic source;

a seat in registry with the free end;

wherein the wire is held by frictional engagement between the free end of the movable part and the seat when the movable part is at the elongated position, and wherein the wire gripper actuator includes:

a position sensor located on the wire gripper actuator, the position sensor generating signals indicative of the position of the free end with reference to the seat;

a flow regulator operatively connected to the wire gripper actuator; and a bypass valve selectively movable between an opened and a closed position in response to the signals received from the position sensor;

whereby the bypass valve is moved to the opened position when the free end of the wire gripper actuator is proximate the seat.

2. An apparatus for installing a length of wire between two crimps, the apparatus comprising:

a wire output guide;

a crimp punch tool located in front of the wire output guide;

a first actuator operatively connected to the crimp punch tool;

a wire cutter tool adjacent to the crimp punch tool;

a second actuator operatively connected to the wire cutter too; and a wire tension mechanism located upstream of the wire output guide, the wire tension mechanism including:

a swing arm having a first and a second end, the first end being pivotally connected to the apparatus;

a first pulley pivotally connected to the second end of the swing arm; and a second pulley pivotally connected to the apparatus, and a wire feeding actuator having a movable part with a free end, the movable part of the wire feeding actuator being selectively movable between an elongated position and a retracted position, the wire feeding actuator being configured and disposed so that the second end of the swing arm moves downwards when its movable part is at the elongated position.

3. The apparatus according to claim 2, wherein the swing arm further comprises a side pin on one side thereof to receive the free end of the movable part of the wire feeding actuator.

4. The apparatus according to claim 2, wherein the wire tension mechanism further comprises a third pulley pivotally connected to the apparatus.

* * * * *